No. 732,195. PATENTED JUNE 30, 1903.
V. LAPP.
APPARATUS FOR DECOMPOSING BREWERS' MASH.
APPLICATION FILED NOV. 13, 1902.
NO MODEL. 5 SHEETS—SHEET 1.
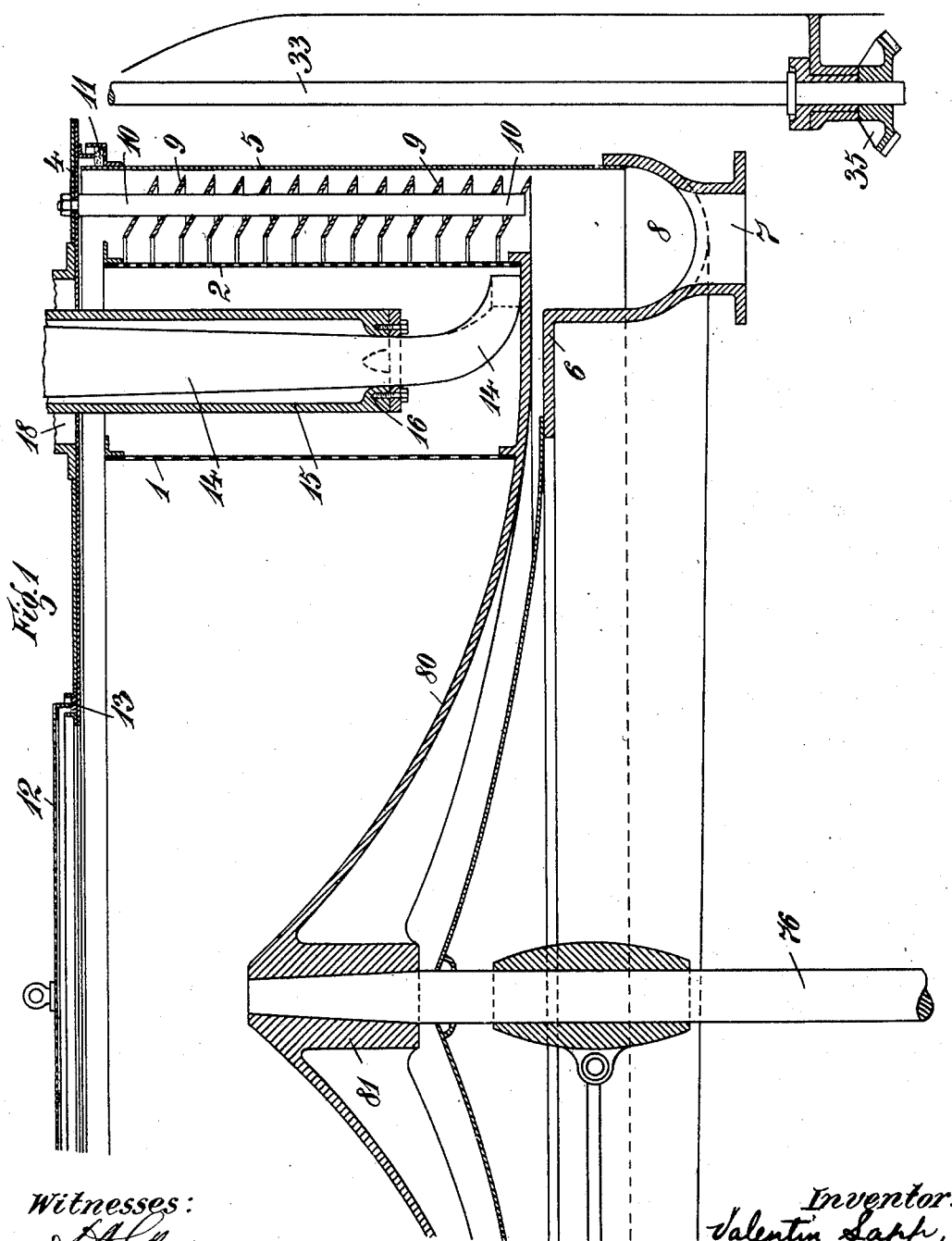

No. 732,195. PATENTED JUNE 30, 1903.
V. LAPP.
APPARATUS FOR DECOMPOSING BREWERS' MASH.
APPLICATION FILED NOV. 13, 1902.
NO MODEL. 5 SHEETS—SHEET 2.
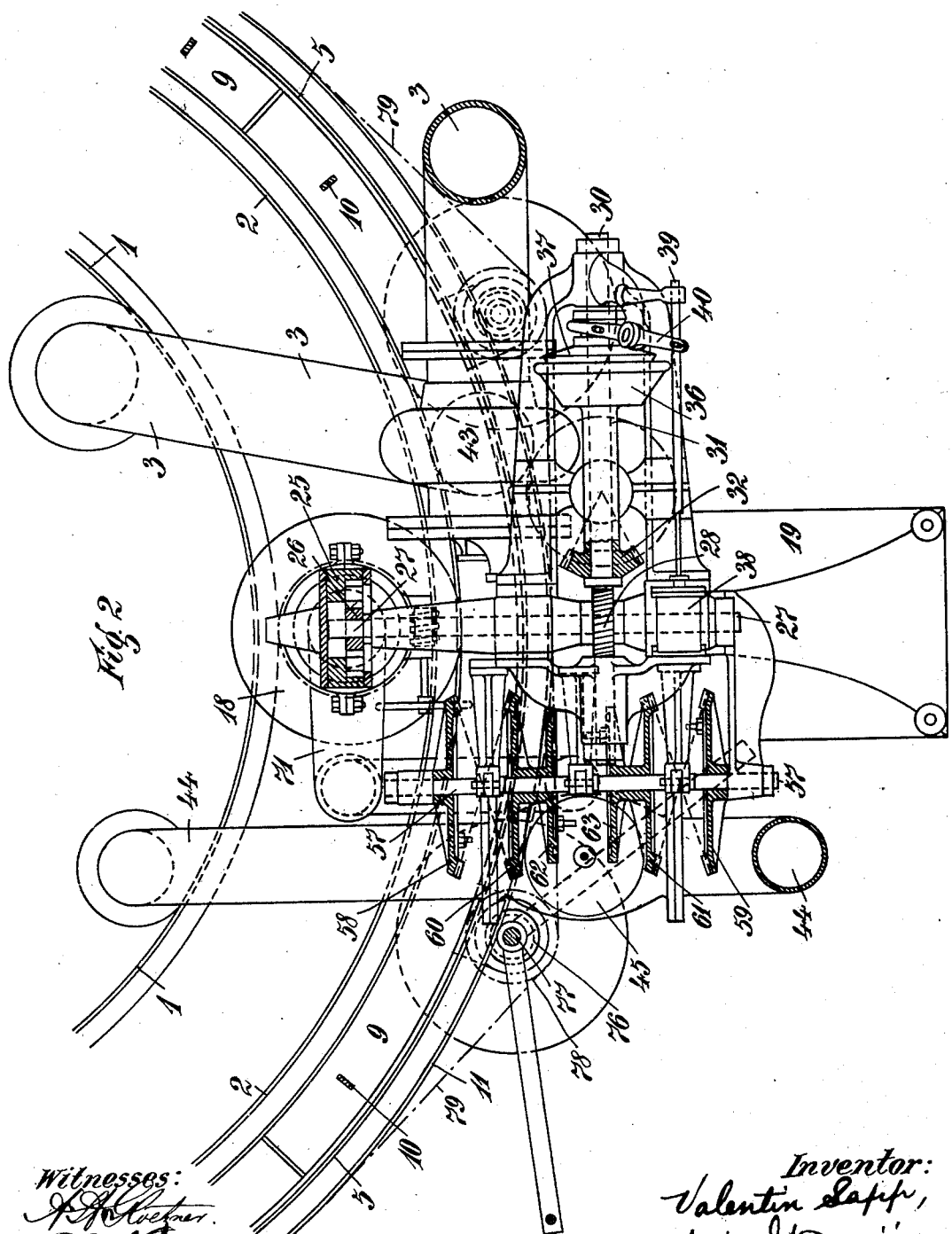

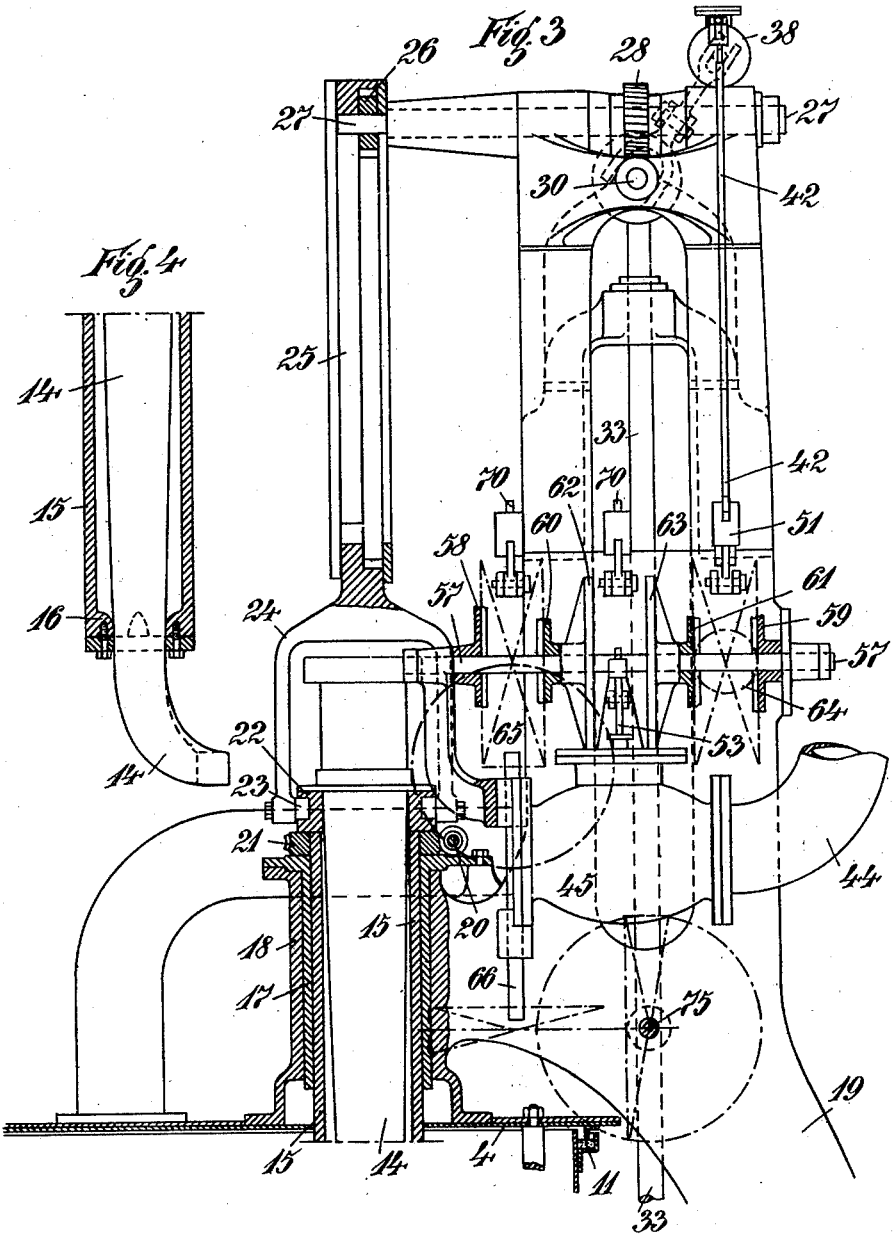

No. 732,195. PATENTED JUNE 30, 1903.
V. LAPP.
APPARATUS FOR DECOMPOSING BREWERS' MASH.
APPLICATION FILED NOV. 13, 1902.
NO MODEL. 5 SHEETS—SHEET 4.
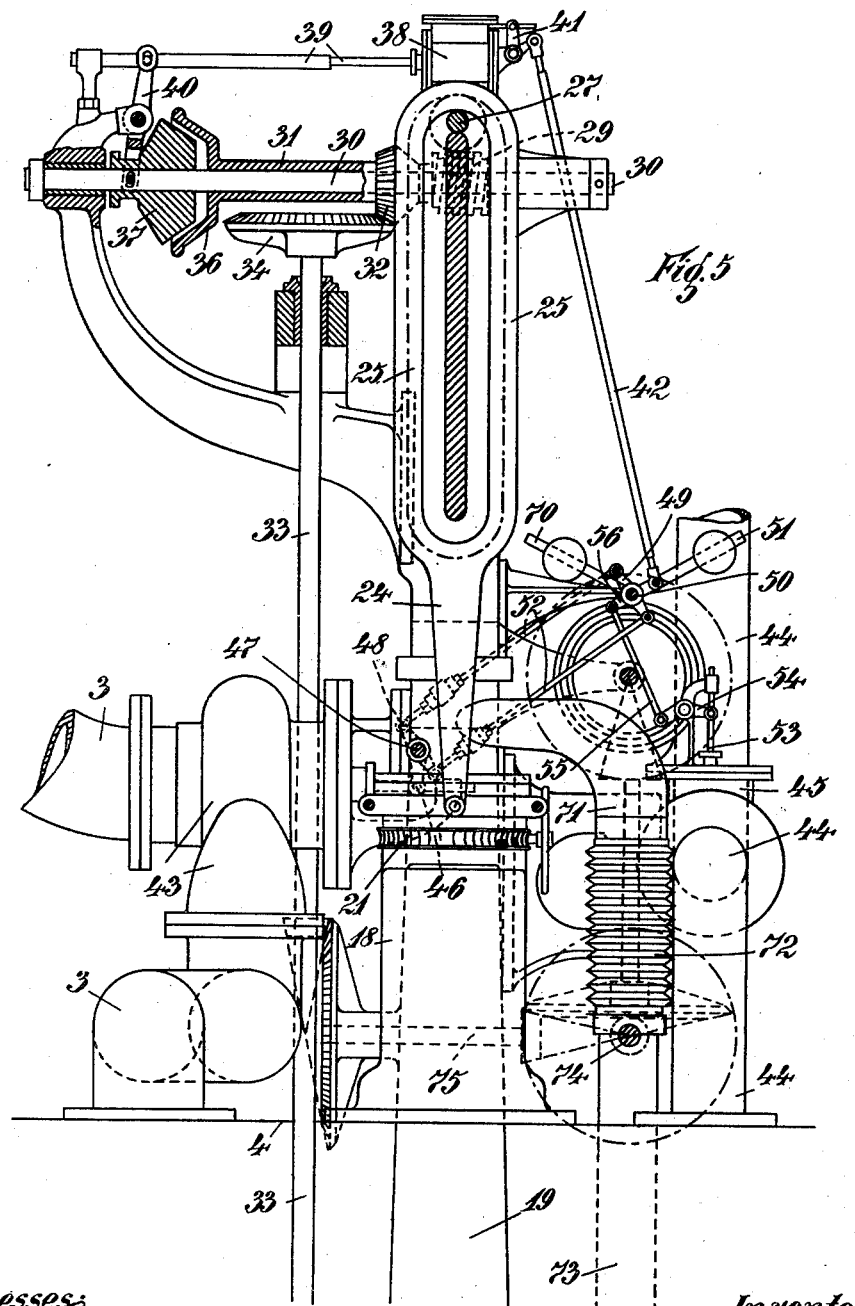

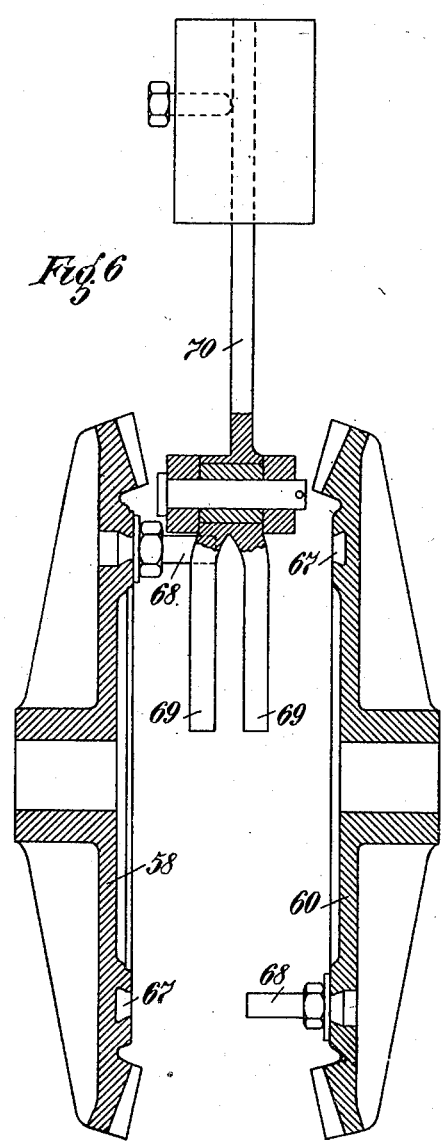

No. 732,195.

Patented June 30, 1903.

UNITED STATES PATENT OFFICE.

VALENTIN LAPP, OF LEIPZIG, GERMANY.

APPARATUS FOR DECOMPOSING BREWERS' MASH.

SPECIFICATION forming part of Letters Patent No. 732,195, dated June 30, 1903.

Application filed November 13, 1902. Serial No. 131,223. (No model.)

*To all whom it may concern:*

Be it known that I, VALENTIN LAPP, a subject of the King of Saxony, residing at Georgiring No. 2, Leipzig, in the Kingdom of Saxony, German Empire, have invented a certain new and useful Improved Apparatus for Decomposing Brewers' Mash and Similar Mixtures into Liquid and their Solid Ingredients, of which the following is a specification.

In accordance with the invention it is intended to decompose mash or similar mixtures into liquid and into their solid constituent parts or ingredients by means of a rotary vat provided with a pervious or perforated wall or with two such walls, one wall circling around the other in the latter case. The process is carried out while the vat is in rotary motion, and during that time not only the mixture decomposed into liquid and into its solid ingredients, but the latter are, furthermore, washed and then, as the vat still continues to rotate, removed from such vat either intermittently or continuously. The removal of the solid substances from the wall of the vat is preferably effected in such a manner that there always remains a layer of such substance, which will act as a filtering layer, and the thickness or depth of which may vary according to the nature of the mash. The mash may consist of pure flour, (or grit,) or it may be a mash such as is more frequently used, which in addition to the grain proper contains husks, in which case of course the liquid will contain both coarse and fine solid particles. Especially in the case of a mash of this description a double-wall clearing or filtering vat should be used in preference to a single-wall one, so that the inner wall may have large perforations and the outer wall small perforations, for in that case a filtering layer of coarse material will form on the inner wall and a filtering layer of fine material on the outer wall, and the whole or part of each of these layers, according to the circumstances, may then be removed either intermittently or continuously, but not until after the material has been thoroughly washed. The outer wall may, if necessary, be provided with a special layer of filtering material adapted for the fine solid particles separated from the mash to settle upon; but whatever arrangements may be made with regard to the details just mentioned the operations are in all cases conducted in such a manner that the several phases—viz., the admission of the mash or the like, the washing of the solid parts, and the removal of the same—are gone through automatically and at such intervals of time as are necessary for the proper performance of the decomposing, washing, and other operations, so that immediately after the termination of the last phase the first phase is entered upon anew, or, in other words, that the whole operation is continuous.

The apparatus required for carrying out this process may be variously constructed. It has already been stated that the revolving vat may be either single-walled or double-walled, and accordingly there may be provided either one or two strippers or scrapers, and these, again, may be constructed in various ways, according as it is intended to remove the material from top to bottom of the wall of the vat at once or gradually in strips, an up-and-down reciprocating stripper being employed in the latter case. However that may be, the stripper immediately on taking the material off the wall should always act in such a manner as either itself to discharge such material from the vat or at all events to bring it to a point from which it may at once be conveyed outside. Where a stripper with up-and-down motion is used, it is not to be noted that the mechanism for operating it may here again vary, and the same applies to the distributing or regulating mechanism whereby the order of succession and the duration of the phases are controlled. Inasmuch, therefore, as that which is herein dealt with is merely a matter of mechanical construction, it is clear that the form of apparatus represented in the drawings appears therein as an example only, many and varied modifications in the details being possible without exceeding the scope or departing from the principle of the invention.

In order to make my invention more clear, I refer to the accompanying drawings, in which similar letters denote similar parts throughout the several views, and in which—

Figure 1 is a vertical section through a part of a rotary vat constructed according to my invention. Fig. 2 is a plan of such a rotary vat in connection with a mechanism which is more fully described hereinafter. Fig. 3 is a side view of said mechanism, the lower part of the stripper 14 being cut away. Fig. 4 shows said lower part of the stripper. Fig. 5 is a rear view of the above-mentioned mechanism, and Fig. 6 shows some details of the same drawn on a larger scale.

Fig. 1 is a vertical section of a rotary clearing or filtering vat having two permeable walls, which consist of two concentric strainers 1 and 2, which are secured to the bottom 80 of the vat. The central portion of this bottom forms a nave 81, which is fixed to the upper end of a shaft 76, by which the vat may be rotated. The perforations of the strainer 1 are larger than are those of the strainer 2, the object being that the finer particles of the solid ingredients of the mash shall pass through the perforations of the strainer 1, but not through those of the strainer 2. The mash is conducted to the vat through a pipe 3, fitted in the roof 4 of the outer casing 5. This pipe does not terminate within the annular space between the strainers 1 and 2, but it terminates within the central space inclosed by the strainer 1. Into the same space terminates a pipe 44, which serves for introducing water into said space, the object of said water being to pass through the residues—i. e., through the solid ingredients retained by the strainers 1 and 2. From the bottom 6 there extends a pipe 7, which serves to conduct away the liquid. The liquid issuing through the strainer 2 is in the first place intercepted by the casing 5, whence it flows into a groove 8, from which it runs off into the pipe 7. Between the strainer 2 and the stationary casing 5 there are inserted sheet-metal rings 9, each of which forms a species of a hollow truncated cone. These flat rings are distributed over the entire height of the ejecting-surface of the vat and intercept the liquid ejected, thereby preventing the formation of any froth. The annular metal sheets or plates 9 are connected together by flat iron bars 10, hanging down from the roof 4 of the casing 5, the latter being provided at the top with a channel or groove 11, lying with suitable packing material in which there engages an angle-iron ring secured to the roof. The roof 4 here consists of an outer annular part and an inner disk-shaped part or lid 12, the joint being tightened in the manner just described. The groove 13, which receives the packing material, is situated in the inner edge of the ring 4, and the angle-iron ring is secured to the edge of the said ring 12.

The stripper 14 (represented in Figs. 1, 3, and 4) is in the form of construction of the rotary vat shown, intended only for the fine ingredients retained by the strainer 2. It is, however, necessary that also the coarse ingredients retained by the strainer 1 should be removed from time to time. This may be effected, if desired, by means of a stripper similar to that shown at 14, and also the means for actuating said stripper may be exactly the same as those hereinafter described for actuating the stripper 14. However, removing the coarse particles from the strainer 1 may be effected, if desired, by any other suitable means, acting upon the whole height of said strainer. If a stripper of the kind shown at 14 is made use of, this stripper may be arranged diametrically opposite to the stripper for the fine particles, or the two strippers may be connected with each other and actuated at a time by one and the same mechanism, preferably such as hereinafter described. The stripper consists of a conical tube, the lower end of which is bent, this end being preferably of square shape and the edge lying next to the wall 2 serving to remove the material. The said stripper 14 is inserted in a tube 15, provided with packing 16 below, so that here also an air-tight joint is formed. The tube 15 is inserted in a sleeve 17, and this sleeve in its turn is inserted in another sleeve 18. The sleeve 18 is mounted on the roof 4 and forms an extension of the standard 19, to which the several devices to be described farther on are secured. The sleeve 17 is revoluble within the sleeve 18 and so connected with the tube 15 that this tube may be moved axially, but not turned within the sleeve; but when the sleeve 17 is turned the tube 18 turns with it and so does necessarily its lower part—i. e., the scraper proper—which has been so adjusted as to be in contact with the layer of material deposited on the perforated wall or strainer 2. Rotary motion is imparted to the sleeve 17 by means of a worm 20, which gears with a worm-wheel 21, mounted at the top of the sleeve 17.

The upper end of the tube 15 is provided with a double flange 22, in the annular groove of which engage the pins 23 of a stirrup-shaped piece 24, which is attached to a plate 25, fitted with an internal set of teeth, which in conjunction with an internal toothed wheel 26 forms a species of mangle-rack. The inner rack of the said plate 25 is closed in and is moved up and down by the toothed wheel 26 constantly turning in the same direction, such rotary motion, however, taking place intermittently, since the stripping-tube 14 is to be moved up and down only at the times corresponding to the phases of ejection.

The shaft or spindle 27, on which the gear-wheel 26 is mounted, also carries a worm-wheel 28, which engages in a worm 29. The shaft or spindle 30, on which the worm-wheel is placed, is surrounded by a sleeve 31, one end of which forms a bevel-wheel 32, which engages with another bevel-wheel 34 on a vertical spindle or shaft 33. The shaft 33 extends downward beyond the rotary vat proper, whence it is set in rotary motion by means of a bevel-wheel 35. The end of the sleeve 31 opposite to the bevel-wheel 32 constitutes a hollow coupling or clutch 36, the counterpart 37 of which is mounted on the shaft 30, the connection between the parts 30 and 37 well known in itself being such that while 37 may be moved along 30 axially it is compelled to turn whenever 30 rotates. While the first half 36 of the coupling is set in rotary motion, the motion is transmitted to the gearing 29, 28, 27, and 26 the moment the second half of the coupling 37 has been thrown into gear with this first half 36. This is effected by hydraulic power, and to this end a hydraulic cylinder 38 is arranged upon the supporting-standard 19, the piston-rod 39 of such cylinder being connected with the coupling or clutch 37 by means of a lever 40. The valve-gear of the hydraulic cylinder 38 is operated through the medium of a bell-crank lever 41 from a rod 42, which at times coinciding with the successive phases is moved up and down, the valves or cocks through which mash and the water for washing it are admitted into the revolving vat being opened or closed (as the case may be) at the same time as such rod is moved in either direction.

The mash is supplied through the pipe 3, fitted with a valve 43, while the water for washing such mash is supplied through a pipe 44, provided with a valve 45. The stem of the valve 43 is by means of an arm 46 joined onto a shaft 47, onto which a double-armed lever 48 is secured. A similar lever 49 is mounted upon a shaft or spindle 50, which also carries a weighted lever 51, connected with the rod 42, serving to control the valve-gear of the hydraulic cylinder 38. The arms of the lever 49 are so connected with the arms of the lever 51 by draw-rods or links 52 that both levers at all times perform identical movements. The weighted lever 51 is adapted to be turned or folded down upon its spindle 50, and according as it occupies one or the other position the valve 43 is either open or closed, because the movements of the parts above named are invariably transmitted to the valve-stem through the medium of the arm 46. The same remark applies to the stem 53 of the valve 45. This stem through the medium of a lever 54 and a link or connecting-rod 55 is in communication with an arm 56, also mounted upon the shaft 50. Hence owing to this connection the valve 45 also opens or closes, according as the said lever 51 is turned up or down. For the operation of this lever the following arrangement is employed: On the ends of a horizontal shaft 57 are mounted bevel-wheels 58 and 59 and between these further bevel-wheels 60 and 61, each of which is connected with a pulley 62 and 63, respectively. The wheels 58 and 61 are fast upon the said shaft 57, while the wheels 59 and 60 are loose thereon. Between 59 and 61 is interposed a bevel-wheel 64, which serves to transmit rotary motion from 61 to 59, but in such a way that 59 turns in the opposite direction to 61. There is, furthermore, a bevel-wheel 65 between 58 and 60, which is secured to the upper end of a vertical shaft 66. From this shaft the wheel 58 is turned through the agency of the wheel 65, which last-mentioned wheel at the same time turns the wheel 60 in the opposite direction to 58, so that the pulleys 62 and 63 are thereby also set to rotating in opposite directions. The sides of these pulleys facing each other and the similarly-situated surface of the pairs of gear-wheels 58 60 and 59 61 are provided with circular grooves 67, each of which receives a pin 68, adjustable within it. There being three pairs of gear-wheels or pulleys, three pairs of pins are also provided, the two pins of each pair standing as a rule at one hundred and eighty degrees to each other. Between every two wheels or pulleys there are interposed curved "fingers" 69, extending in practically opposite directions. One of said pins moves one finger in one direction, while the second pin moves the second finger in the other direction, so that inasmuch as the fingers are connected both with each other and with a weighted arm 70 this arm is alternately turned in one or the other direction. With the parts 69 70 there is further connected a lever-arm 49, from which the motion is transmitted farther—viz., in one case to the valve 43, in the other to the valve 45, while in the third set of the parts named it is the rod 42 for controlling the hydraulic valve-gear which is directly joined to the weighted lever. The pins 68 must always be so adjusted that the fingers 69 are moved at times corresponding to the several phases of the filtering and clarifying operation, including the processes of washing and expelling the solid parts. There takes place, therefore, first, the opening of the mash-valve 43, then the closing of such valve, and simultaneously therewith or immediately afterward the opening of the water-valve 45, and after this the removal of the solid parts by the scraper 14, which is now moving up and down. This scraper is at its upper end provided with a bent or curved pipe 71, which by a flexible bellows-shaped intermediate part 72 is connected to the waste-pipe 73, such a flexible connection, as 72, being necessary, because the pipe 71 moves up and down during the ejection of the residues. The liquid now issues at 7 after having found its way between the intercepting plates or sheets 9 into the channel.

The shaft 66 receives rotary motion through the medium of a pair of bevel-wheels (merely indicated in dotted lines in the drawings) from a horizontal shaft 74, which in its turn receives rotary motion from a horizontal shaft 75 through another pair of bevel-wheels, (also merely dotted in the drawings.) This last-mentioned horizontal shaft extends toward the shaft 33, with which it is connected likewise through a pair of bevel-wheels. The rotation of the bevel-wheel 35, situated at the lower part of the shaft 33, may be produced by any suitable means, and the same applies to the shaft 76 of the vat 1 2.

Having now described my invention, what I desire to secure by Letters Patent of the United States is—

1. As a means for decomposing mash or similar mixtures into liquid and solid components, the combination with a rotary vat, having a perforated vertical wall, of means for collecting the liquid, means for washing the solid components retained by the perforated wall, and vertically-reciprocated means for removing said components from said wall.

2. As a means for decomposing mash or similar mixtures into liquid and solid components, the combination with a vat adapted to be rotated, a circular strainer forming the wall of said vat, a stationary casing surrounding said vat, means for washing the solid components retained by the circular strainer, and means consisting of a hollow tube for removing said components from said strainer.

3. As a means for decomposing mash or similar mixtures into liquid and solid components, the combination with a rotary vat having a perforated wall, of means for introducing the mash into said rotary vat, means for introducing water to wash the solid components retained by the perforated wall of the same, means for removing said components from said wall, consisting of a bent hollow tube adapted to be actuated vertically with its mouth in contact with the wall; and means for automatically causing the introduction of the wash and of the water and the removing of the solid components to be effected at consecutive times.

4. As a means for decomposing mash or similar mixtures into liquid and solid components, the combination with a rotary vat having a perforated wall, of means for introducing the mash into said rotary vat, means for introducing water to wash the solid components retained by the perforated wall of the same, means for removing said components from said wall, consisting of a hollow tube having its mouth of substantially rectangular cross-section and adapted to contact with the wall; and means for regulating the consecutiveness and duration of the introduction of the mash and of the water and of the removing of the solid components.

5. As a means for decomposing mash or similar mixtures into liquid and solid components, the combination with a rotary vat, a strainer forming a wall of said vat, another strainer fixed inside the former and having larger perforations than the outer strainer, of means for introducing the mash into the space inclosed by the inner strainer, means for introducing water into the same space, and means for removing the coarse solid particles from the inner strainer and the fine solid particles from the outer strainer.

6. As a means for decomposing mash or similar mixtures into liquid and solid components, the combination with a rotary vat, a circular strainer forming the wall of said vat, a stripper adapted to reciprocate vertically at the inner surface of said strainer, means for introducing the mash into the space inclosed by said strainer, means for introducing water into the same space, and means for collecting the ejected liquids.

7. As a means for decomposing mash or similar mixtures into liquid and solid components, the combination with a rotary vat, a circular strainer forming the wall of said vat, a stripper adapted to reciprocate vertically at the inner surface of said strainer, a pipe adapted to conduct the mash into the space inclosed by said strainer, a valve in said pipe, another pipe adapted to conduct water into the same space, a valve in said other pipe, and means for actuating consecutively the first-mentioned valve, the other valve, and the strainer.

8. As a means for decomposing mash or similar mixtures into liquid and solid components, the combination with a rotary vat having a perforated wall, of means for introducing the mash into said rotary vat, means for introducing water to wash the solid components retained by the perforated wall of the same, a stripper adapted to remove said solid components, a mangle-gear connected with said stripper and adapted to impart motion to it, means for operating said mangle-gear, a coupling intercalated into said means, means for throwing said coupling into gear after the washing-water has been introduced into the vat, and out of gear before the mash is introduced into the vat.

9. As a means for decomposing mash or similar mixtures into liquid and solid components, the combination with a rotary vat having a perforated wall, of means for introducing the mash into said rotary vat, means for introducing water to wash the solid components retained by the perforated wall of the same, a stripper adapted to remove said solid components, a mangle-gear connected with said stripper and adapted to impart motion to it, means for operating said mangle-gear, a coupling intercalated into said means, a hydraulic cylinder and piston connected with said coupling, a water-distributing valve for said cylinder and piston, and means for actuating said valve after the washing-water has been introduced into the vat and before the mash is introduced into the same.

10. As a means for decomposing mash or similar mixtures into liquid and solid components, the combination with a rotary vat having a perforated wall, of means for introducing the mash into said rotary vat, means for introducing water to wash the solid components retained by the perforated wall of the same, means for removing said components from said wall, means connected with said means and adapted to establish and interrupt consecutively the respective connections, adjustable projections adapted to actuate said levers correspondingly, pairs of rotary disks having said projections attached to them, the two disks of each pair being adapted to rotate in opposite directions, a shaft carrying said pairs of disks, and means for rotating said shaft.

11. As a means for decomposing mash or similar mixtures into liquid and solid components, the combination with a rotary vat having a perforated wall, of means for introducing the mash into said rotary vat, means for introducing water to wash the solid components retained by the perforated wall of the same, means for removing said components from said wall; weighted levers connected with said means and adapted to establish and interrupt consecutively the respective connections by being swung to one and the other side, adjustable projections adapted to actuate said levers correspondingly; pairs of rotary disks having said projections attached to them, the two disks of each pair being adapted to rotate in opposite directions; a shaft carrying said pairs of disks, and means for rotating said shaft.

12. As a means for decomposing mash or similar mixtures into liquid and solid components, the combination with a rotary vat, a circular strainer forming the wall of said vat, a stripper adapted to reciprocate vertically at the inner surface of said strainer, a pipe adapted to conduct the mash into the space inclosed by said strainer, a valve in said pipe, another pipe adapted to conduct water into the same space, a valve in said other pipe, weighted levers connected one with the means for causing the strainer to reciprocate, another with the first-mentioned valve, and a third with the other valve, adjustable projections adapted to actuate said levers correspondingly, pairs of rotary disks having said projections attached to them, the two disks of each pair being adapted to rotate in opposite directions, a shaft carrying said pairs of disks, and means for rotating said shaft.

13. As a means for decomposing mash or similar mixtures into liquid and solid components, the combination with a rotary vat, a circular strainer forming the wall of said vat, a stripper adapted to reciprocate vertically at the inner surface of said strainer, a pipe adapted to conduct the mash into the space inclosed by said strainer, a valve in said pipe, another pipe adapted to conduct water into the same space, a valve in said other pipe, weighted levers connected one with the means for causing the strainer to reciprocate, another with the first-mentioned valve and a third with the other valve, adjustable projections adapted to actuate said levers correspondingly, pairs of rotary disks carrying said projections, the two disks of each pair being adapted to rotate in opposite directions, a shaft carrying said pairs of disks and being firmly connected with one disk of each pair, the other disk being loose on said shaft, means for rotating the said shaft and for transmitting the motion from the fixed disk to the loose ones.

14. As a means for decomposing mash or similar mixtures into liquid and solid components, the combination with a rotary vat having a perforated wall, of means for introducing the mash into said rotary vat, means for introducing water to wash the solid components retained by the perforated wall of the same, a stripper adapted to remove said solid components, a mangle-gear connected with said stripper and adapted to impart motion to it, means for operating said mangle-gear, a coupling intercalated into said means, a hydraulic cylinder and piston connected with said coupling, a water-distributing valve for said cylinder and piston, weighted levers connected one with said water-distributing valve, another with the mash-valve and a third with the valve for the washing-water, projections adapted to actuate said levers correspondingly, pairs of rotary disks carrying said projections, the two disks of each pair being adapted to rotate in opposite directions, a shaft carrying said pairs of disks and being firmly connected with one disk of each pair, the other disk being loose on said shaft, means for rotating the said shaft and for transmitting the motion from the fixed disk to the loose ones.

15. As a means for decomposing mash or similar mixtures into liquid and solid components, the combination with a vat adapted to be rotated, a circular strainer forming the wall of said vat, a stationary casing surrounding said vat, a series of superposed rings of frusto-conical section located between the strainer and the stationary casing; means for washing the solid components retained by the circular strainer, and means for removing said components from said strainer.

In witness whereof I have hereunto set my hand in presence of two witnesses.

VALENTIN LAPP.

Witnesses:
RUDOLPH FRICKE,
B. H. WARNER, Jr.